United States Patent
Cobble

[19]

[11] Patent Number: 6,062,733

[45] Date of Patent: *May 16, 2000

[54] REINFORCED WRIST-PIN

[76] Inventor: Daniel L. Cobble, 3401 Lesway Ct. Ste. 12, Louisville, Ky. 40220

[ * ] Notice: This patent issued on a continued prosecution application filed under 37 CFR 1.53(d), and is subject to the twenty year patent term provisions of 35 U.S.C. 154(a)(2).

[21] Appl. No.: 08/969,305

[22] Filed: Nov. 13, 1997

[51] Int. Cl.[7] ................................ F16C 9/02; F16C 3/04; F16J 1/14

[52] U.S. Cl. ................................ 384/294; 74/595; 92/187

[58] Field of Search ................................ 74/523 E, 595; 123/193.6; 403/150, 154; 92/187; 384/288, 294

[56] References Cited

U.S. PATENT DOCUMENTS

| | | | |
|---|---|---|---|
| 3,702,092 | 11/1972 | Zollner | 92/187 |
| 4,406,558 | 9/1983 | Kochendorfer et al. | 403/150 X |
| 4,430,906 | 2/1984 | Holtzberg et al. | 74/595 |
| 4,572,058 | 2/1986 | Hinz et al. | 92/187 |
| 5,009,124 | 4/1991 | Beaurepaire et al. | 74/595 |

*Primary Examiner*—Thomas R. Hannon
*Attorney, Agent, or Firm*—Wheat, Smith & Beres, PLC; J. L. Simunic; J. A. Wheat

[57] ABSTRACT

A wrist-pin, in which the inner tubular area is traversed by intersecting plates that traverse at the rotating axis and extending along at least a portion of the length, and thereby, said inner tubular area is divided into longitudinal sections. Ideally, the connecting-rod is positioned and affixed to the wrist-pin so that the first of such plates form traversed alignment with length of the connecting-rod, for directly transmitting forces from the piston, through said first plate, to the connecting-rod, whereas such forces are no longer effectively exerted upon the upper circular asymmetry of the wrist-pin, to prevent flexing of the wrist-pin. When stroke cycle progression positions the piston to be perpendicular to the connecting-rod, the second plate functions as a supplemental reinforcement member for the equalized force distribution about said upper circular asymmetry of the wrist-pin, thus to also prevent flexing, thereof, and providing for the acquired rigidity of the wrist-pin to he composed of non-traditional high-strength polymer composites or thin-walled metal.

18 Claims, 7 Drawing Sheets

REINFORCED WRIST-PIN

FIELD OF THE INVENTION

The present invention relates to engines and compressors and, most specifically, the force-transmitting assemblies relating to the function of pistons.

BACKGROUND OF THE INVENTION

The weight-reduction of engine and compression components is highly sought for improved efficiency, lower operating costs, reduction of air-pollution, and to minimize dependence on foreign resources. In an effort to reduce the weight of force-transmitting assemblies such as the piston, wrist-pin, connecting-rod, and bearings, fundamental structural dynamics must be considered. A particular design approach involves the use of lightweight polymers composites to comprise some or all of these components.

Hence, a specific consideration lies in the operating dynamics of a polymer wrist-pin, because unlike the higher tensile strength of metal wrist-pins, a polymer wrist-pin of the traditional configuration will tend to flex under lighter compression loads on both sides of the connecting-rod along the lateral plane of the wrist-pin. Therefore, the asymmetry of a polymer wrist-pin must be appropriately reinforced, and such acquired reinforcement may serve to help design wrist-pins that are composed of metal.

What is needed is a wrist-pin that addresses the various force loading dynamics for appropriate polymers, as well as for metal construction. This design would provide an important link for successful force transmission from cylinder to crankshaft, via the piston, wrist-pin and connecting-rod, respectively.

SUMMARY OF THE INVENTION

Although there have been recent notable developments in wrist-pin bearing design, such as assignor Bryden's single-flange bearing, U.S. Pat. No. 5,145,264, and assignor Flem's double-flange pop-in bearing, U.S. Pat. No. 5,145,265, seemingly, virtually no work has resulted in integrated reinforcement of the traditionally hollow wrist-pin configuration. Hence, currently used reinforcement methods consist of assemblies that interface with the piston and are external and modular of the wrist-pin.

The present invention has an inner area of the wrist-pin divided into longitudinal sections by two plates that are integrated to the inner tubular surface and extend along the substantial length. These "first" and "second" plates form a traverse intersection at the rotating axis of the wrist-pin to form a "cross" throughout the traverse plane, to provide extraordinary "equalized traverse reinforcement" (ETR) to prevent lateral flexing of the wrist-pin.

Configuration of this design serves two important functions. First, when the first plate, which may also be termed the "alignment plate," is affixed for traverse alignment with the length of the connecting-rod while the piston is aligned with such connecting-rod, compression forces are directly transmitted from the piston and through the alignment plate without exerting substantial loads about the upper asymmetry of the wrist-pin. Traditionally, the hollow wrist-pin requires high tubular strength to withstand substantial loads.

The reinforced wrist-pin greatly improves lateral rigidity on both sides of the centered connecting-rod, because compression forces are "felt" and equalized along the entire length of the alignment plate. Therefore, the reinforced wrist-pin also allows for reduction in thickness (weight) of the wrist-pin's tubular wall, and the thickness of the plates are determined by the specified force-transmitting load. Therefore, ETR works equally well for all-metal wrist-pins.

Secondly, when progression of the stroke cycle positions the piston to be angled to the connecting-rod, the alignment plate is respectively angled, as the traverse characteristics of the second plate supplements reinforcement of the alignment plate. Since the load is only "felt" along the upper lateral half of the wrist-pin, the traverse cross continues to prevent flexing. So, ETR, appropriately stiffens the wrist-pin throughout the stroke cycle.

Hence, the physical law of ETR dictates that the wrist-pin will not begin to flex until compression forces approach the tensile-strength limit of the wrist-pin's composed material. Upon exceeding such limit, the wrist-pin will suffer "equalized" disintegration and/or deformation, because there are no weakened points along the entire length of the wrist-pin's asymmetry. This characteristic is unprecedented amongst wrist-pin structural design.

To contain "creep expansion" of a polymer material, the interfacing surfaces of the wrist-pin and piston may be sleeved with metal bearing material. Such configuration will ensure the close tolerances that are necessary since creep expansion and/or contraction of polymers may affect the mechanical tolerances of rotating/moving components.

The wrist-pin is laterally secured within the piston by traditional-type C-clips or retainer rings. The wrist-pin may be grooved at both ends to receive such retainer rings that abut to the flanged journal of the piston.

At the center bottom of the wrist-pin, where the connecting-rod is affixed, increased thickness within the tubular wall accommodates a securing means such as screws to attach the wrist-pin to the connecting-rod.

LIST OF ILLUSTRATIONS

DETAILED DESCRIPTION OF THE PREFERRED EMBODIMENTS

Figure 1:
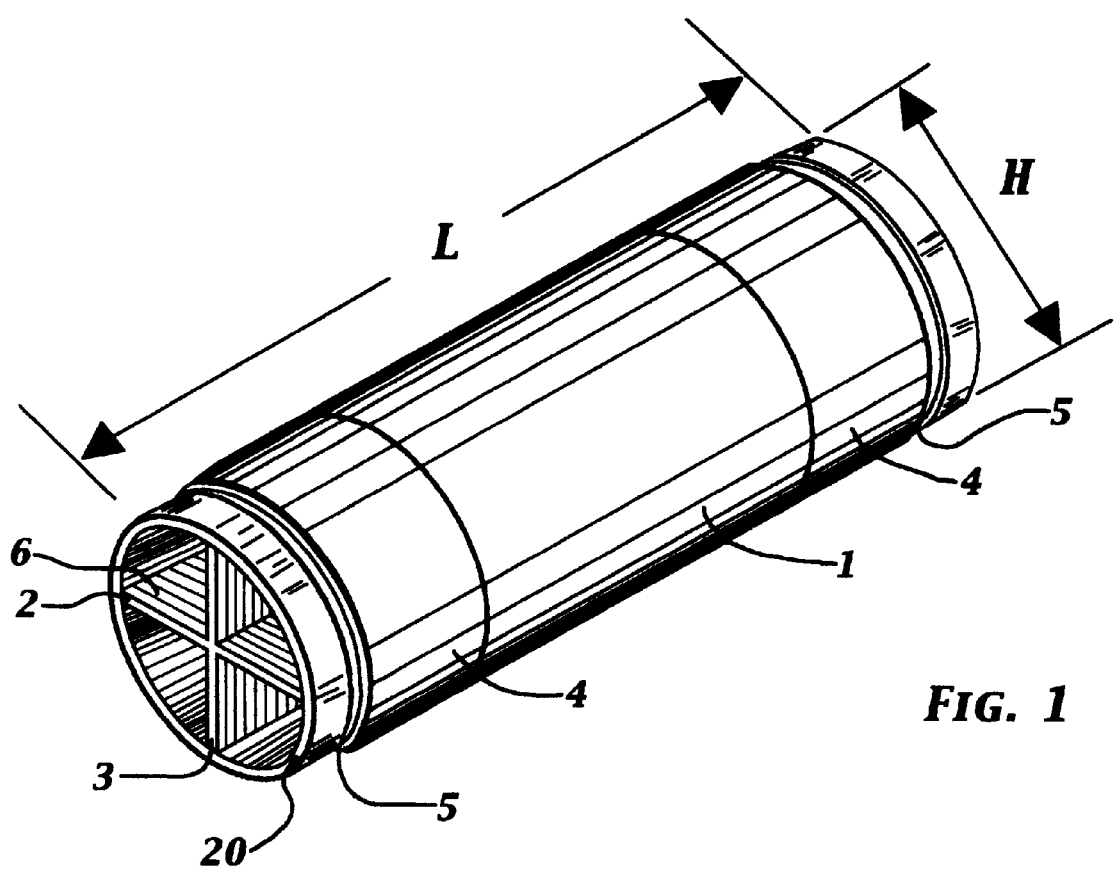
FIG. 1 is a composite view of the reinforced wrist-pin.

FIG. 1 is a composite view of the reinforced wrist-pin 1 as the traditional wrist-pin cylinder wall 20 that houses horizontal plate 2 and vertical plate 3 that intersect and extend along wrist-pin's length. Tubular spacing 6 depicts one of the four sectional spacings that are created by the crossing plates. Both essential ends of the wrist-pin are sleeved by wrist-pin bearing material 4, and retainer ring grooves 5 receives retainer rings for securing the wrist-pin within a piston journal. Measurement lines H for the height and L for the length of the wrist-pin are also provided.

Figure 2:
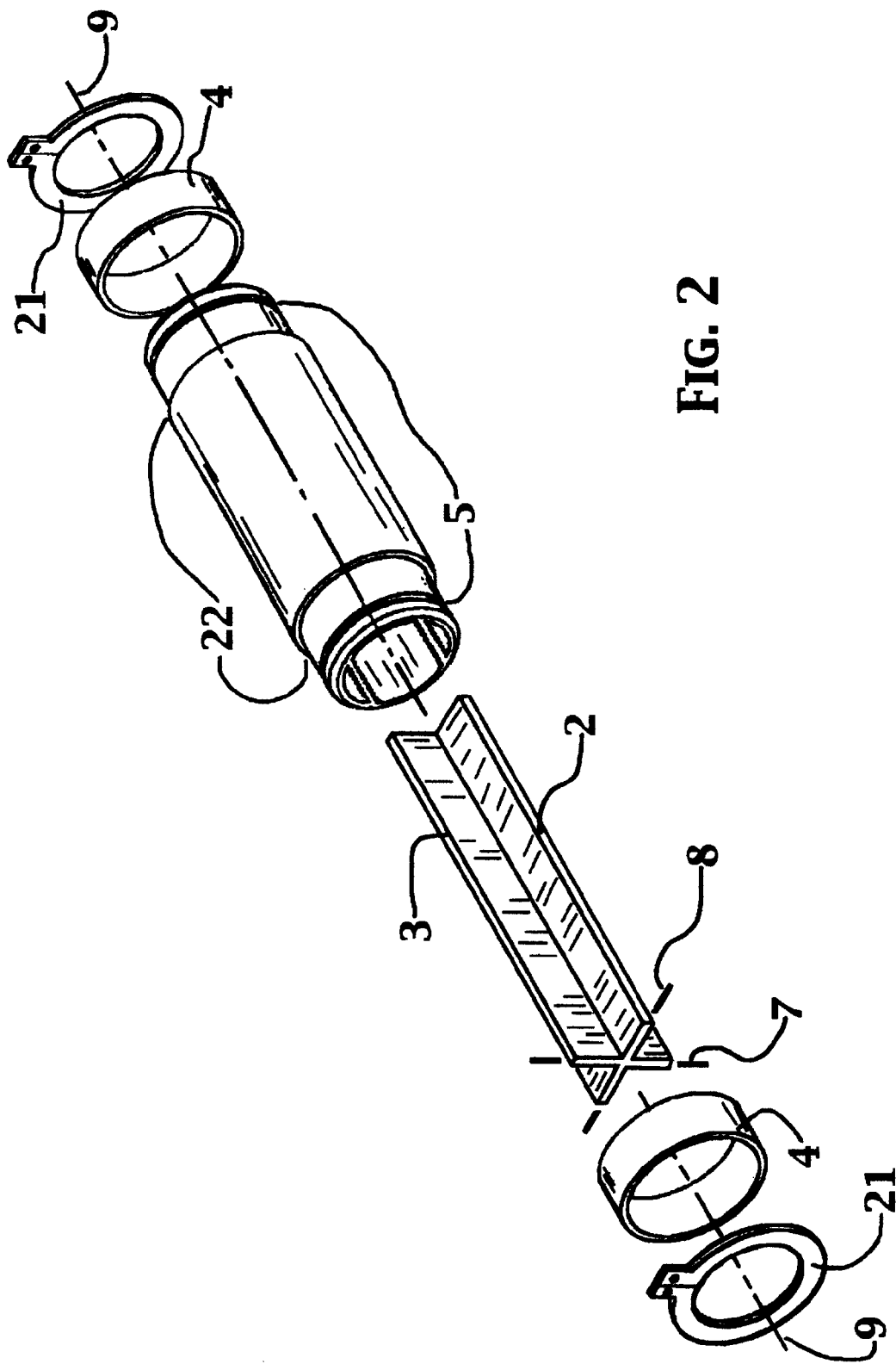
FIG. 2 is an exploded view of the reinforced wrist-pin.

FIG. 2 shows an exploded view of the wrist-pin which correspond to the embodiments as described in FIG. 1. Detachment of said plates 2 & 3 is also shown, in which corresponding intersect lines 8 and 7 depict creation of the traverse cross as formed by said plates. Axis line 9 extends throughout the length of the exploded outlay to clarify the rotating axis of the wrist-pin. Retainer rings 21 correspond and are seated into said grooves upon assembly of the wrist-pin and piston. Abutment indentions 22 provide points where sleeved said wrist-pin bearing material 4 adjoin for appropriate seating and flush-mounted assembly.

Figure 3:
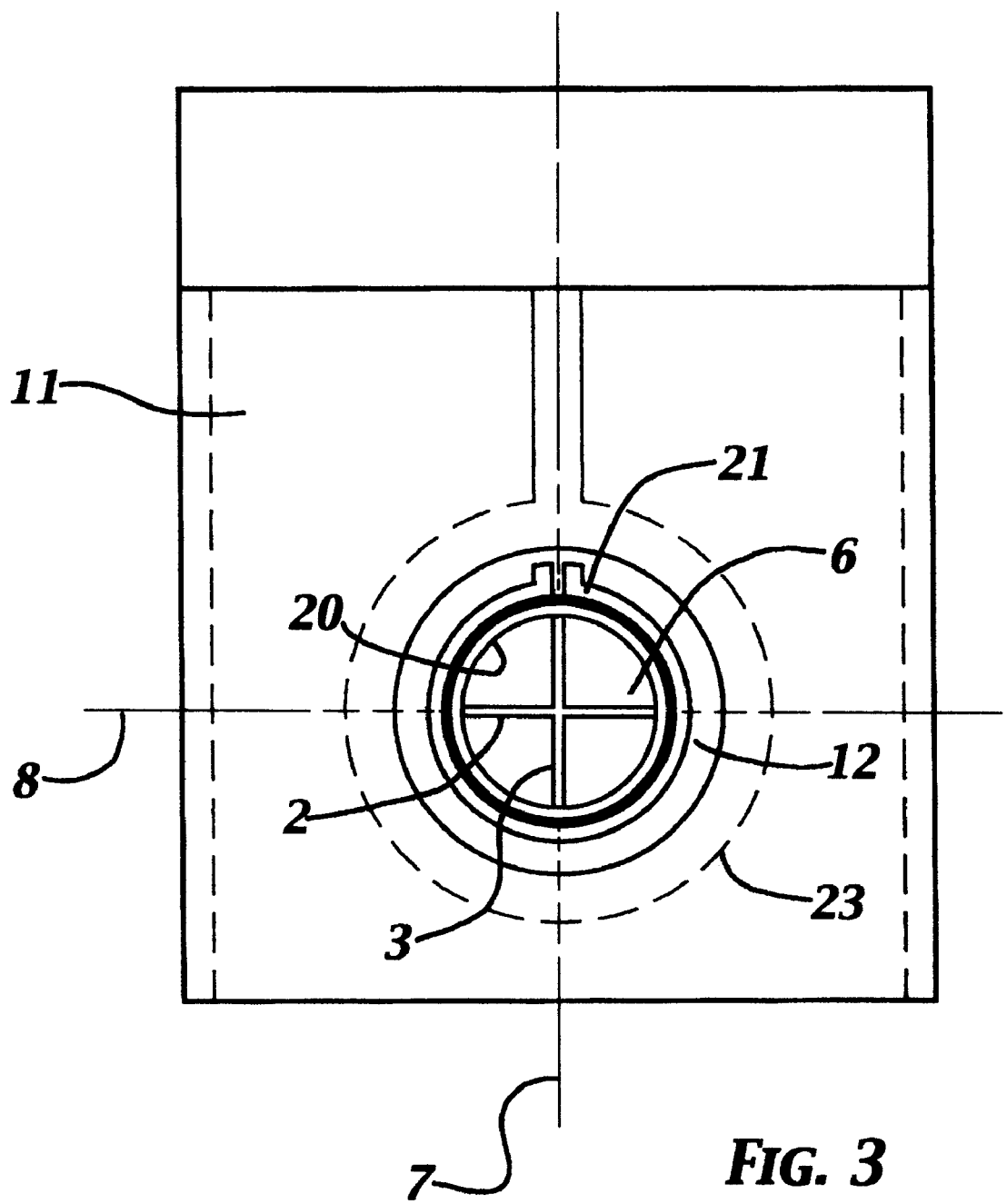
FIG. 3 is a cross-sectional outline of the reinforced wrist-pin installed in the piston.

FIG. 3 shows an outline view of the wrist-pin cross-section when installed in the piston. All of embodiments correspond with the same items as described in FIGS. 1 and 2. Internal structural line 23 depicts the outer internal edge of piston bearing 12 within the piston for placement and rotation of said wrist-pin bearing material.

Figure 4:
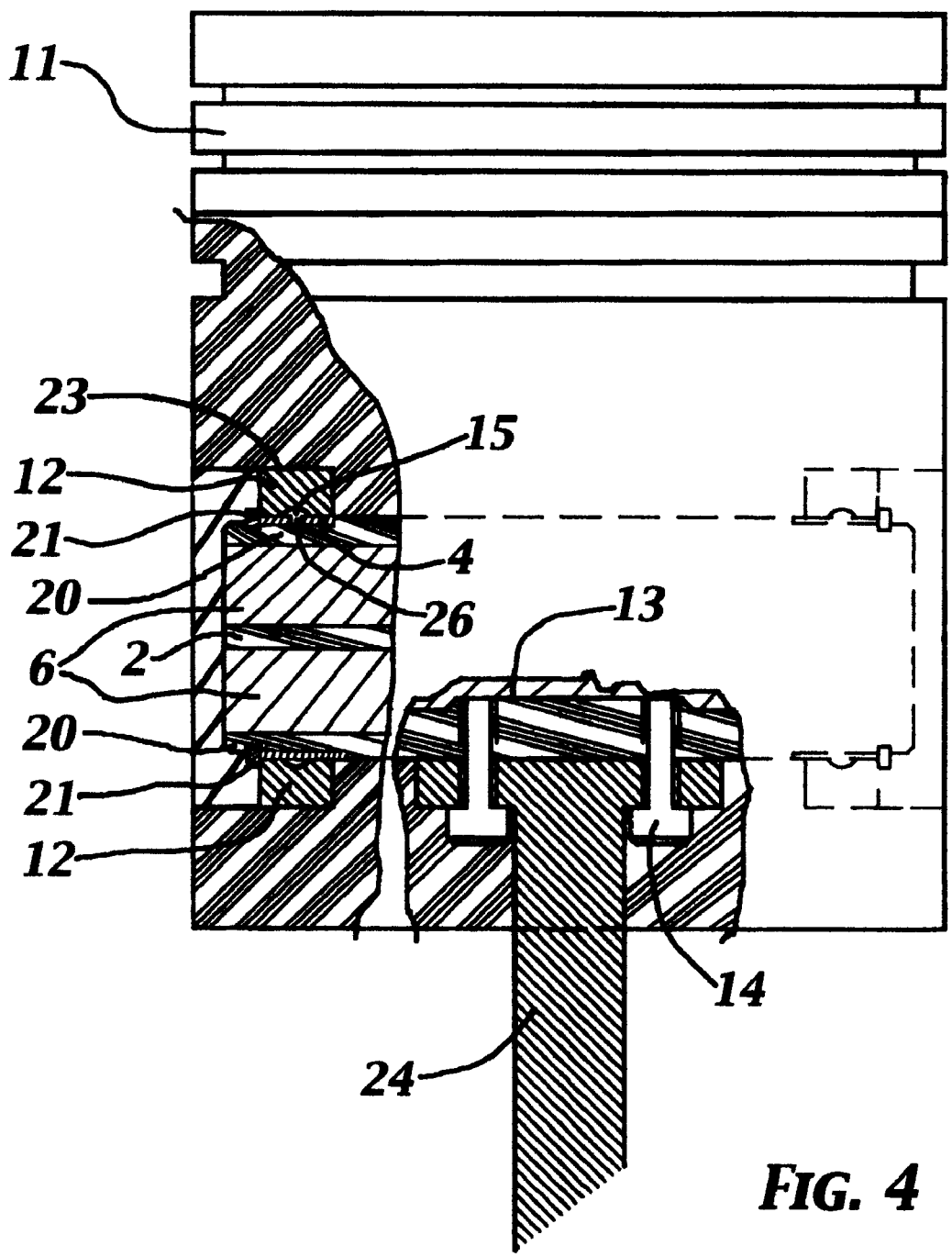
FIG. 4 shows a cut-away view of the reinforced wrist-pin interfaced with the piston and connecting-rod.

FIG. 4 shows cut-away views of two areas of the piston for longitudinal and cross-sectional placement of the above described components, which include top and bottom cut-off of components 23,12,21, and 4. Said piston bearing 12 interfaces with said wrist-pin bearing material. The lateral edge of plate 2 is shown. Said retainer ring 21 insets into the wrist-pin slot (item in FIGS. 1 & 2). Said wrist-pin cylinder 20 is also laterally shown. Oil hole 15 of said piston bearing corresponds with oil hole 26 of said wrist-pin bearing material to receive lubrication during mechanical operation. In the other cut-away view of FIG. 4, elevated surface area 13 of said cylinder wall allows for adequate entry of a securing means such as screws 14 that binds connecting-rod 24 to the wrist-pin.

Figure 5:
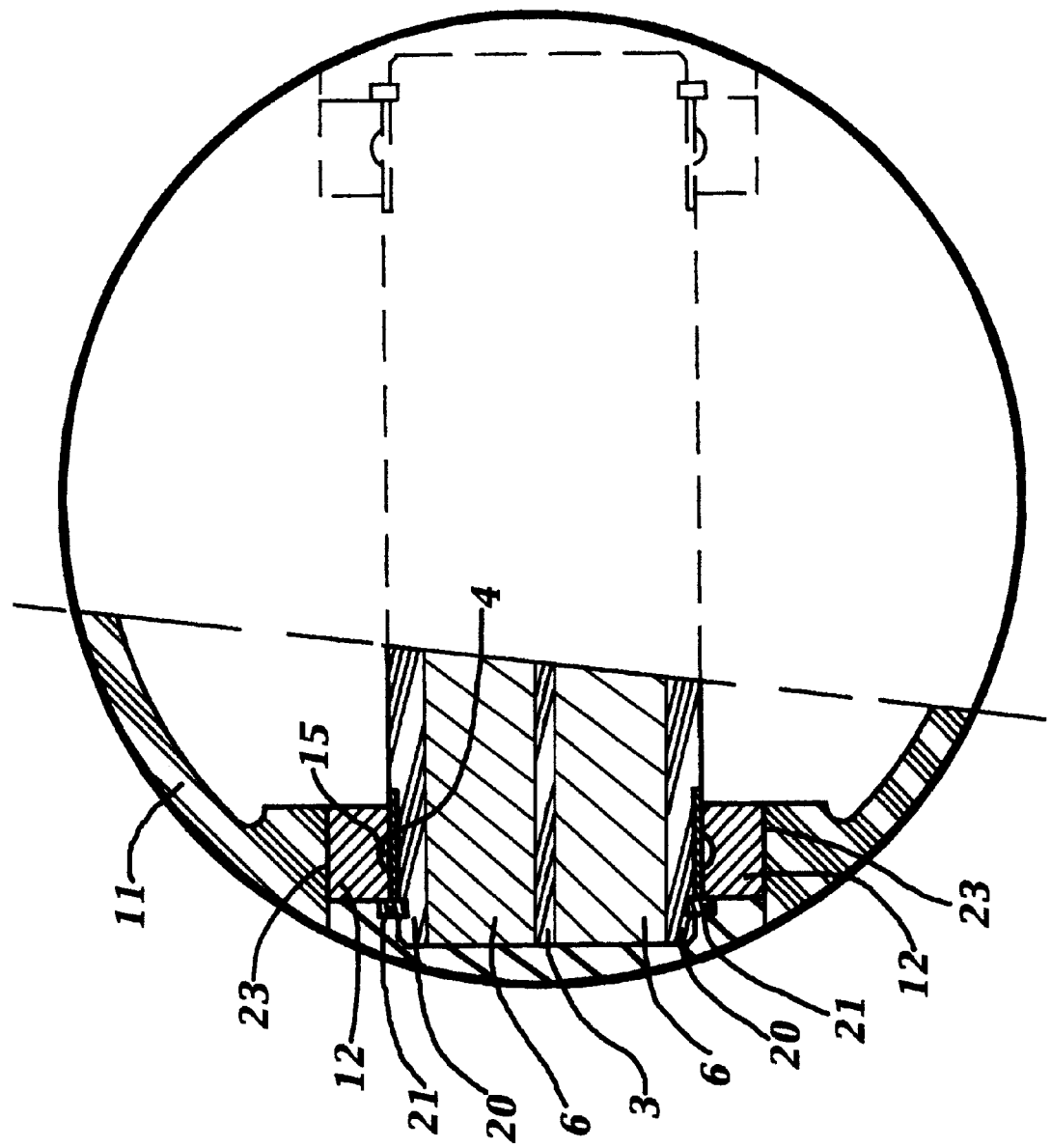
FIG. 5 shows a cut-away view of the reinforced wrist-pin from the top of the piston.

FIG. 5 shows a top view of the wrist-pin inside the piston from with a cut-away view of on end of the wrist-pin, which includes a cross-surface cut-off of the various components on both sides: 23,12,21 and 4. The top of said plate 3 is shown, and all other embodiments are as described in FIG. 4.

Figure 6:
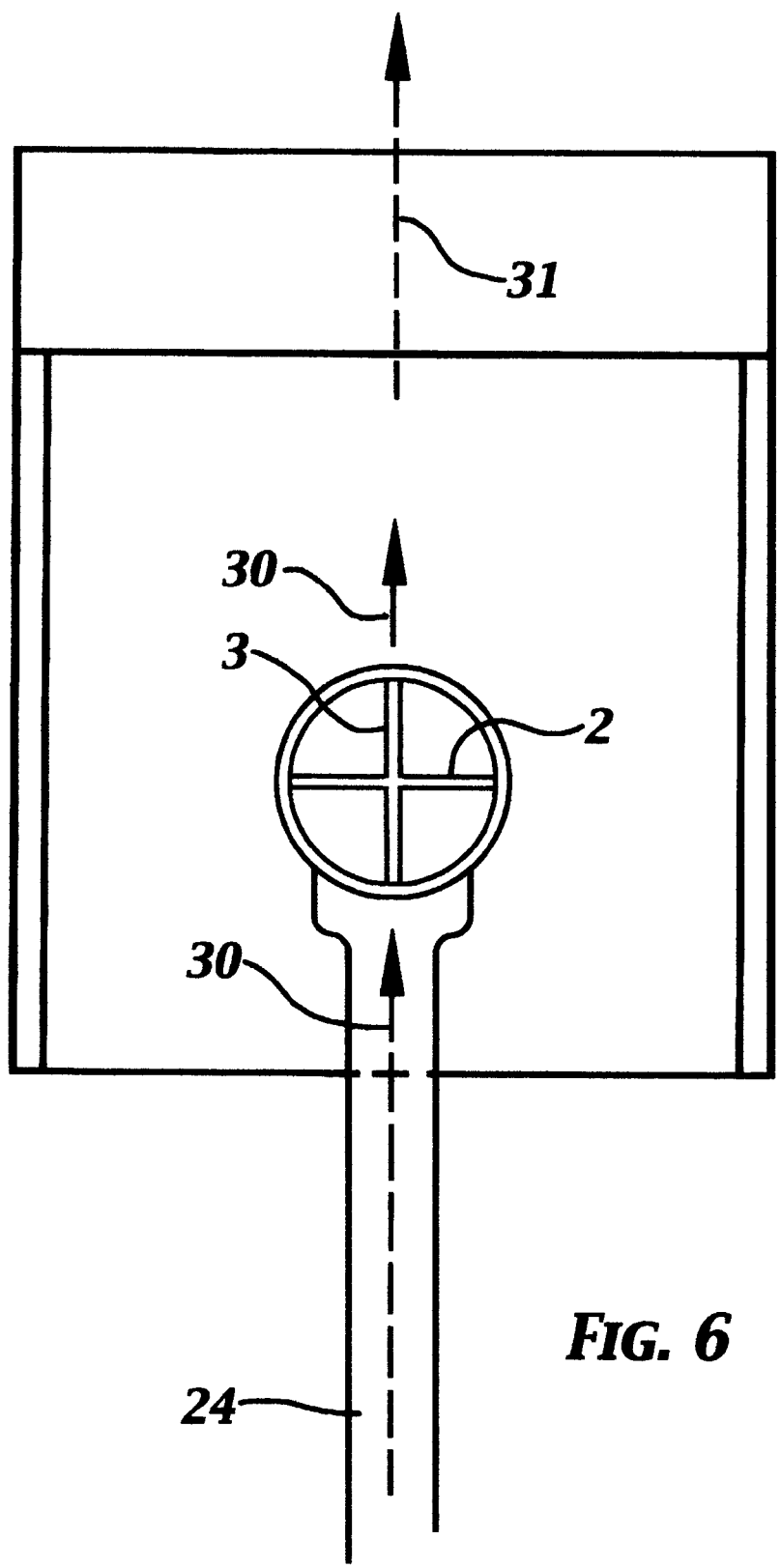
FIG. 6 is a simplified view of traverse alignment of the first plate, connecting-rod, and piston.

In FIG. 6, alignment arrows 30 and 31 depicts traverse longitudinal alignment of the verticle said first plate of the wrist-pin, connecting-rod, and piston, in which the height of said first plate provide direct reinforcement of the wrist-pin structure when subjected to a load upon the crown of the piston.

Figure 7:
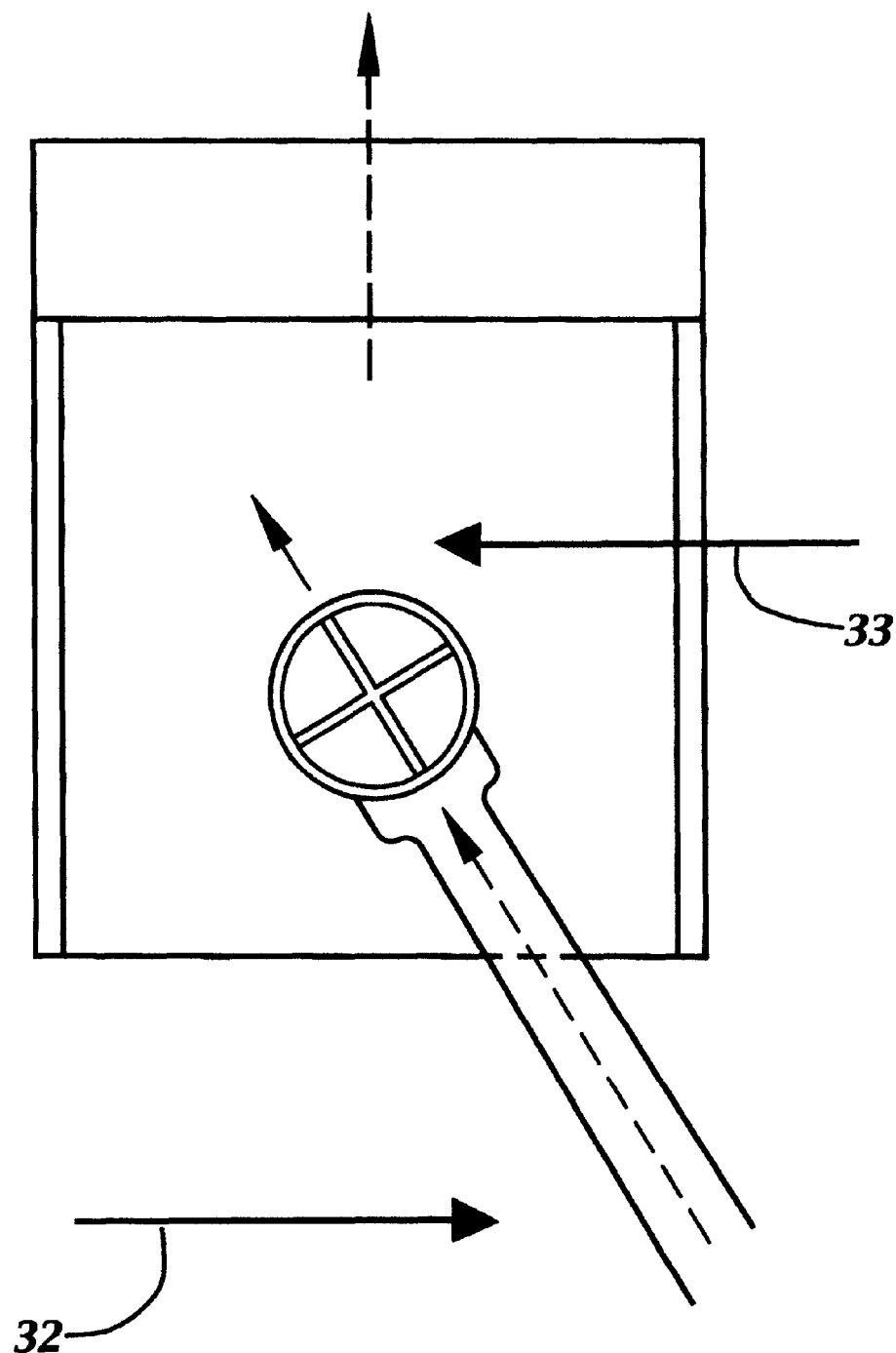
FIG. 7 is a simplified view that shows alignment of the first plate and connecting-rod when rotated to be perpendicular to the piston.

FIG. 7 shows the virtual same outlay as FIG. 6, except that shift-arrows 32 and 33 depicts progression of the piston's stroke cycle, in which said first plate and connecting-rod are rotated for effective mis-alignment to the piston (see progressive misalignment of said alignment arrows), and said second plate has rotated "toward" alignment with said alignment arrow 31, to provide supplemental reinforcement of the upper asymmetry of the wrist-pin, in reference to the load exerted upon the piston.

What I claim is:

1. A wrist-pin having an inside circular wall, and the respective inside cylindrically hollow area of said wrist-pin being intervened by a rectangular first plate, in which the length of said first plate extending lengthwise of said wrist-pin; said first plate being integrated with said circular wall along the lengthwise topside and bottomside of said first plate; the placement of said first plate being cross-sectionally perpendicular to said circular wall, for traverse reinforcement of the wrist-pin's structure between said topside and said bottomside of said first plate.

2. The wrist-pin of claim 1 including further: said wrist-pin having a rectangular second plate that traverses and integrates with the said first plate; said second plate being integrated to said circular wall the same as said first plate.

3. The wrist-pin of claim 1 including further: both ends of said wrist-pin having a separate journal sleeve for rotationally operating within a journal housing.

4. The wrist-pin of claim 1 including further: said wrist-pin being affixed to a connecting-rod for mechanical placement of the traversed height of said first plate to align in a straight line with said connecting-rod when said connecting-rod is extended to the point within the cylinder that is closest to the top of said cylinder; as said first plate provides reinforcement of the lateral plane of said wrist-pin, in which the height of said first plate is essentially aligned with the mechanically directional load that is exerted upon an operatively connecting piston to said wrist-pin.

5. A wrist-pin having an inside circular wall, and the respective inside cylindrically hollow area of said wrist-pin being intervened by a rectangular first plate, in which the length of said first plate extending lengthwise of said wrist-pin; said first plate being integrated with said circular wall along the lengthwise topside and bottomside of said first plate; the placement of said first plate being cross-sectionally perpendicular to said circular wall, for traverse reinforcement of the wrist-pin's structure between said topside and said bottomside of said first plate; and said first plate dividing said area into respective portions for respective through-pass openings of said wrist-pin.

6. The wrist-pin of claim 5 including further: said wrist-pin having a second said plate that traverses said first plate; said second said plate being integrated to said circular wall the same as said first plate; and said second plate dividing said area into respective portions for respective through-pass openings of said wrist-pin.

7. The wrist-pin of claim 5 including further: both ends of said wrist-pin having a separate journal sleeve for rotationally operating within a journal housing.

8. The wrist-pin of claim 5 including further: said wrist-pin being affixed to a connecting-rod for mechanical placement of the traversed height of said first plate to align in a straight line with said connecting-rod when said connecting-rod is extended to the point within the cylinder that is closest to the top of said cylinder; as said first plate provides reinforcement of the lateral plane of said wrist-pin, in which the height of said first plate is essentially aligned with the mechanically directional load that is exerted upon an operatively connecting piston to said wrist-pin.

9. A wrist-pin having an inside circular wall, and the respective inside area of said wrist-pin being intervened by a first plate, in which the length of said first plate extending lengthwise of said wrist-pin; said first plate being integrated with said circular wall along the lengthwise topside and bottomside of said first plate; the placement of said first plate being cross-sectionally perpendicular to said circular wall, for traverse reinforcement of the wrist-pin's structure between said topside and said bottomside of said first plate.

10. The wrist-pin of claim 9 including further: said wrist-pin having a second plate that traverses said first plate; said second plate being integrated to said circular wall the same as said first plate.

11. The wrist-pin of claim 9 including further: both ends of said wrist-pin having a separate journal sleeve for rotationally operating within a journal housing.

12. The wrist-pin of claim 9 including further: said wrist-pin being affixed to a connecting-rod for mechanical placement of the traversing height of said first plate to align in an essentially straight line with said connecting-rod when said connecting-rod is extended to the point within the cylinder that is closest to the top of said cylinder; as said first plate provides reinforcement of the lateral plane of said wrist-pin, in which the height of said first plate is essentially aligned with the mechanically directional load that is exerted upon an operatively connecting piston to said wrist-pin.

13. A wrist-pin having an inside wall, and the respective inside area of said wrist-pin being intervened by a reinforcing structural member:
(a) the length of said member extending lengthwise of said wrist-pin; said member being integrated with said wall along the lengthwise topside and lengthwise bottomside of said member; the placement of said member being cross-sectionally angled to said wall and providing traverse reinforcement of the wrist-pin's structure between said topside and said bottomside of said member,
(b) said wrist-pin being affixed to a connecting-rod for mechanical placement of the traversing height of said member to align in an essentially straight line with said connecting-rod when said connecting-rod is extended to the point within the cylinder that is closest to the top of said cylinder, as said member provides reinforcement along the lateral plane of said wrist-pin in which the height of said member is essentially aligned with the mechanically directional load that is exerted upon an operatively connecting piston to said wrist-pin.

14. A wrist-pin having an inside wall, and the respective inside area of said wrist-pin being intervened by a reinforcing structural first member, in which the length of said member extending lengthwise of said wrist-pin; said member being integrated with said wall along the lengthwise topside and lengthwise bottomside of said member; the placement of said member being cross-sectionally angled to said wall and providing traverse reinforcement of the wrist-pin's structure between said topside and said bottomside of said member.

15. The wrist-pin of claim 14 including further: said wrist-pin having a second member being the same as said first member.

16. The wrist-pin of claim 14 including further: said wrist-pin having a second member being the same as said first member and said second member traversing said first member.

17. The wrist-pin of claim 14 including further: both ends of said wrist-pin having a separate journal sleeve for rotationally operating within a journal housing.

18. The wrist-pin of claim 14 including further: said wrist-pin being affixed to a connecting-rod for mechanical placement of the traversing height of said member to align in an essentially straight line with said connecting-rod when said connecting-rod is extended to the point within the cylinder that is closest to the top of said cylinder, as said member provides reinforcement along the lateral plane of said wrist-pin in which the height of said member is essentially aligned with the mechanically directional load that is exerted upon an operatively connecting piston to said wrist-pin.

* * * * *